United States Patent
Armangau et al.

(10) Patent No.: US 9,355,112 B1
(45) Date of Patent: May 31, 2016

(54) OPTIMIZING COMPRESSION BASED ON DATA ACTIVITY

(71) Applicant: EMC Corporation, Hopkinton, MA (US)

(72) Inventors: Philippe Armangau, Acton, MA (US); Xiangping Chen, Sherborn, MA (US); Dennis T. Duprey, Raleigh, NC (US); Karl M. Owen, Chapel Hill, NH (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/731,279

(22) Filed: Dec. 31, 2012

(51) Int. Cl.
*G06F 17/30* (2006.01)

(52) U.S. Cl.
CPC .................. *G06F 17/30153* (2013.01)

(58) Field of Classification Search
CPC .................. G06F 17/30153; G06F 17/30312; G06F 17/30303; G06F 17/3028; G06F 2212/401; H03M 7/30; Y10S 707/99942
USPC .......................................................... 707/693
See application file for complete search history.

(56) References Cited

U.S. PATENT DOCUMENTS

| | | | |
|---|---|---|---|
| 2008/0162523 A1* | 7/2008 | Kraus et al. | 707/101 |
| 2009/0043792 A1* | 2/2009 | Barsness et al. | 707/101 |
| 2009/0300015 A1* | 12/2009 | Kazan et al. | 707/7 |
| 2010/0106933 A1* | 4/2010 | Kamila et al. | 711/171 |
| 2012/0173477 A1* | 7/2012 | Coutts et al. | 707/602 |
| 2012/0271868 A1* | 10/2012 | Fukatani et al. | 707/822 |
| 2013/0024432 A1* | 1/2013 | Pendharkar | G06F 17/30147 707/693 |

* cited by examiner

*Primary Examiner* — Richard Bowen
(74) *Attorney, Agent, or Firm* — John T. Hurley; Jason A. Reyes; Krishnendu Gupta

(57) ABSTRACT

A method is used in managing data compression in storage systems. A request to compress particular data stored within a memory space is received. An activity level for the particular data is determined. Compression is enabled for data determined to have an activity level below a predetermined threshold and compression is disabled for data determined to have an activity level above the predetermined threshold.

13 Claims, 9 Drawing Sheets

OPTIMIZING COMPRESSION BASED ON DATA ACTIVITY

BACKGROUND

1. Technical Field

This application relates to optimizing compression based on data activity.

2. Description of Related Art

To reduce the storage space taken by data that is stored on a data storage device, the data may be compressed at the time of writing, e.g., compressed data, rather than uncompressed data, is written to the data storage device.

Some algorithms perform compression by replacing often-repeated sequences of text or data with substitute placeholder that is smaller in size than the sequence that it replaces. The larger the sequences that are replaced, the more efficient the algorithm becomes, allowing the compressed file to be smaller and smaller relative to the size of the uncompressed file. Such compression algorithms will first search the entirety of the data to be compressed, called the compression domain, to find the largest sequences that are repeated within the compression domain. The larger the compression domain, the more opportunities there are for the compression algorithm to find larger repeating sequences. For this reason, compression algorithms tend to be more efficient as the compression domain gets larger.

However, in systems where the content of the compression domain changes, the compressed data must be decompressed, modified, and recompressed. For this reason, system performance tends to be less efficient as the compression domain gets larger, because a change to any portion of a large compression domain requires that the entire compression domain be decompressed, modified, and recompressed. If, instead, the dataset is divided into smaller compression domains, a change to one portion of the dataset requires decompression and recompression of a smaller portion of the dataset.

Choosing the size of the compression domain is therefore a balance between compression efficiency and system performance. Choosing the boundaries of the compression domains can also have a significant effect on compression efficiency and system performance. A compression domain may be very large if the data within its boundaries—i.e., the contents of that compression domain—do not change very often.

One approach to selecting the boundary of a compression domain is to attempt to encompass data that will be likely to change together or not change at all. That is, if one portion of the data within the compression domain changes, other portions of the data within the compression domain are also likely to change, resulting in a decompress-modify-modify-modify-recompress strategy. This increases efficiency because the decompress and recompress operations are typically more resource-intensive than the modify operations. In other words, if the system has to go to the trouble of decompressing and recompressing, the overhead caused by multiple modifications is relatively small in comparison.

One conventional example of this approach is what is herein referred to as "file-based" compression, in which the file construct is the boundary of the compression domain: one file is one compression domain, another file is another compression domain, and so on. When one portion of a file changes, it is likely that other portions of the same file also change, but does not increase the likelihood that another file will also change.

There are disadvantages to file-based compression, however. Storage devices may not operate at the file level, and thus may not even be aware of the file construct. For example, a hard disk drive may respond to requests for logical blocks of available storage space, without knowing to which file, if any, those logical blocks belong. Thus, file-based compression cannot be implemented by a low level entity, such as the storage device, but must be controlled by a higher-level entity, i.e., one that is aware of the file structure and the mapping of file to logical or physical addresses within the storage device. In file-based compression, the file itself is compressed, but the meta-data that describes the file or its location, such as the directory entry for the file, is not compressed. For this reason, the file contents must be compressed before being sent to the data storage device: the data storage system receives commands to write the already compressed data to the data storage device. Furthermore, the file system must maintain information with each file to indicate whether the file data that is stored on the data storage is device is compressed or uncompressed data.

Another conventional approach is for the compression domain to be equal to the unit of reservation or unit of allocation used by the data storage system. For example, multiple data storage devices may collectively provide a pool of data storage blocks that may be allocated to logical units or reserved by processes. In this scenario, each logical unit or portion thereof may be a separate compression domain. Under this approach, the compression domain is not based on a storage block's membership in a file, but on the storage block's membership with a unit of reservation or a unit of allocation. This approach has the advantage that compression can be performed at a low level, e.g., by the allocation or reservation entity or even by the storage device itself, without having to know the higher-level file or directory structures. Furthermore, the file system operates as if every file is uncompressed, and will send and receive uncompressed file data, which is silently compressed before write to the data storage device and uncompressed upon read from the data storage device.

However, there are disadvantages to this approach, as well. In systems where the logical unit has been selected as the compression domain, any write into the logical unit can potentially require (and probably will require) the decompress-modify-recompress operation to be performed. In addition, regardless of the size of the compression domain, the decompress and recompress steps are resource-intensive (and therefore also time-intensive). Furthermore, the compression operation is multiple times more resource intensive than the decompression operation. For systems that perform multiple decompress-modify-recompress operations, this can cause a severe bottleneck in performance when reading from and writing to a compressed logical unit.

SUMMARY OF THE INVENTION

A method is used in managing data compression in storage systems. A request to compress particular data stored within a memory space is received. An activity level for the particular data is determined. Compression is enabled for data determined to have an activity level below a predetermined threshold and compression is disabled for data determined to have an activity level above the predetermined threshold.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Techniques described herein provide selective compression based on the activity level of data associated with an input/output (IO) request. The activity level represents how often a data object (e.g., a data block) is being accessed. Activity level may also be categorized based on the data's temperature. For example, hot data or a hot spot may refer to data that is frequently accessed and cold data or cold spot may refer to data that is infrequently access.

Conventional compression methods will scan all blocks of data in a logical unit (LU) and attempt to compress every block, hot and cold data alike. However, some of this work is very likely to be quickly undone in that hot data that is frequently accessed will need to be uncompressed and/or re/compressed over and over. Such a method creates additional system overhead and reduces system response time.

In contrast, techniques described herein provide a framework wherein a range-lock mechanism provides a way to expose data activity level for each individual data block to various applications such as a compression application or engine. With access to such information, the compression engine can configured to operate more selectively to improve overall system performance.

Selective compression techniques do not require compression of an entire data space (e.g., file system, LU, etc.) referred to forthwith as file system. Rather, such techniques enable determination of the activity level of each block of data. This data is then evaluated as a candidate for compression and, if the data is selected for compression, compression is carried out for that data. Such evaluation of data in the most active areas of the memory space for selective compression avoidance while continuing to compress less active areas of memory space provides a smart methodology for prioritizing compression effort. Additionally, such selective compression has significantly less impact on system performance than a conventional compression process that attempts to compress an entire file system. In some arrangements, such selective compression is carried out transparently in the background (e.g., consuming otherwise unused processor cycles). Unless indicated otherwise, selective compression as use herein refers to selectively compressing a data block based on particular criteria, such as data activity level. For example, compression may be disabled for high activity data (i.e., hot data) and compression may be enabled for low activity data (i.e., cold data).

Figure 1:
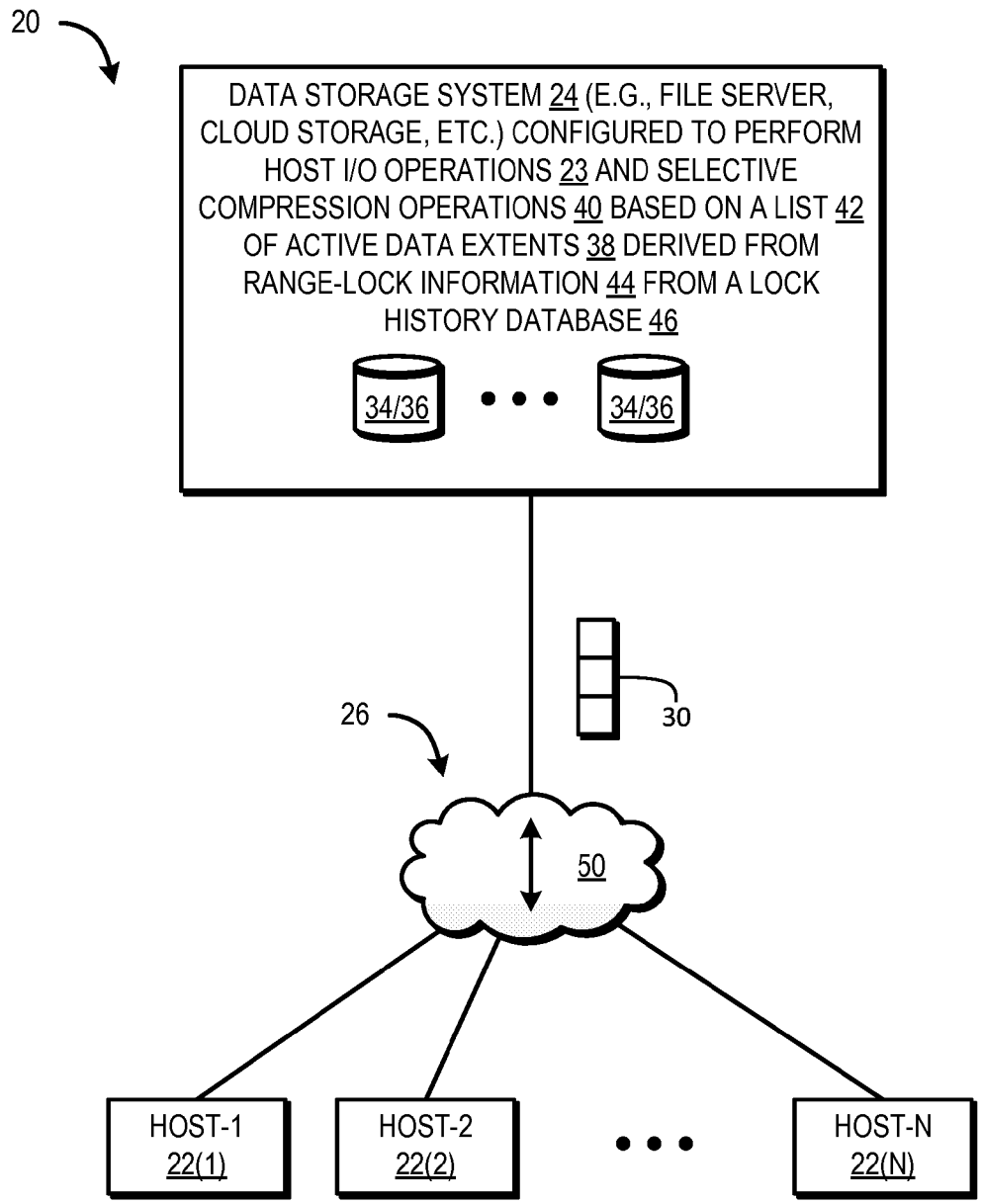
FIG. 1 is an example embodiment of a system that may utilize the techniques described herein.

FIG. 1 shows a data storage environment 20 which is equipped for selective compression based on IO hot spots. The data storage environment 20 includes host devices 22(1), 22(2) . . . (collectively, host devices 22), a data storage system 24, and a communications medium 26.

The host devices 22 are constructed and arranged to store host data into and load host data from the data storage system 24. Along these lines, each host device 22 provides host IOs 30 (e.g., read commands to read host data, write commands to write host data, etc.) to the data storage system 24 for processing.

The data storage system 24 is constructed and arranged to process the host IOs 30 from the host devices 22 by performing host IO operations 32 (e.g., read IOs, write IOs, etc.) on a set of LUs 34. Each LU 34 is partitioned into slices (e.g., 1 GB slices) 36, and each slice 36 is partitioned into multiple extents (e.g., 8 KB extents) for holding data, i.e., data extents 38. Such extents provide an addressable memory space (e.g., via logical block addressing or LBAs) and are mappable (e.g., to file system block numbers or FSBNs). Other slice sizes (e.g., 256 MB) and/or extent sizes may be similarly utilized.

Additionally, the data storage system 24 is constructed and arranged to perform selective compression disable operations 40 based on a list 42 of active data extents 38 (i.e., data which has been accessed frequently within a recent time period). Such selective compression disable operations 40 include, among others things, polling for data extent activity information, ranking data extents 38 based on the activity information (e.g., hot or cold temperature), performing compression evaluation operations on the data extents 38 and, if a decision is made to compress the data extents 38, selectively compressing less active data (cold data) and disabling compression for more active data (e.g., hot data). As will be explained in further detail below, the data storage system 24 is able to construct the active data extent list 42 from range lock information 44 stored in a lock history database 46 and to perform the selective compression operations 40 based on such range-lock information 44.

The communications medium 26 connects the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub and spoke, loop, irregular, combinations thereof, and so on. Along these lines, the communications medium 26 may include copper based data communications devices and cabling, fiber optic devices and cabling, wireless devices, combinations thereof, etc. Furthermore, the communications medium 26 is capable of supporting LAN-based communications, SAN based communications, or combinations thereof.

During operation, the data storage system 24 receives host IOs 30 from the host devices 22. In order to maintain data consistency, the data storage system 24 imposes locks on the data extents 38 when processing the host IOs 30. For example, the data storage system 24 applies read (or shared) locks on ranges of data extents 38 when the host devices 22 read host data from these ranges of data extents 38. Furthermore, the data storage system 24 applies write (or exclusive) locks on ranges of data extents 38 when the host devices 22 write host data to these ranges of data extents 38.

As the data storage system 24 imposes range locks on the ranges of data extents 38, the data storage system 24 updates the range-lock information 44 in the lock history database 46 based on these range locks. From the lock history database 46, the data storage system 24 is then able to identify which data extents 38 in the memory space are more active than others, and evaluate whether to compress the less active data extents 38 while ignoring, at least temporarily, the more active data extents 38. Accordingly, the data storage system 24 is able to advantageously focus its compression efforts on less active data extents 38 within the memory space.

Moreover, in some arrangements, the memory space spans multiple tiers of storage which are tiered based on IO access time (e.g., a first tier of flash memory, a second tier of SAS memory, and a third tier of near line SAS memory, etc.). In these arrangements, when the data storage system 24 disables compression for a set of active data extents 38, the data storage system 24 relocates the active data extents 38 to a higher storage tier if possible (i.e., if a faster storage tier exists, if available space exists, etc.). In certain arrangements, the data storage system 24 evacuates less active data extents 38 to a lower storage tier (i.e., slower storage) in order to provide room for the non-compressed active data extents 38. Further details will now be provided with reference to FIG. 2.

Figure 2:
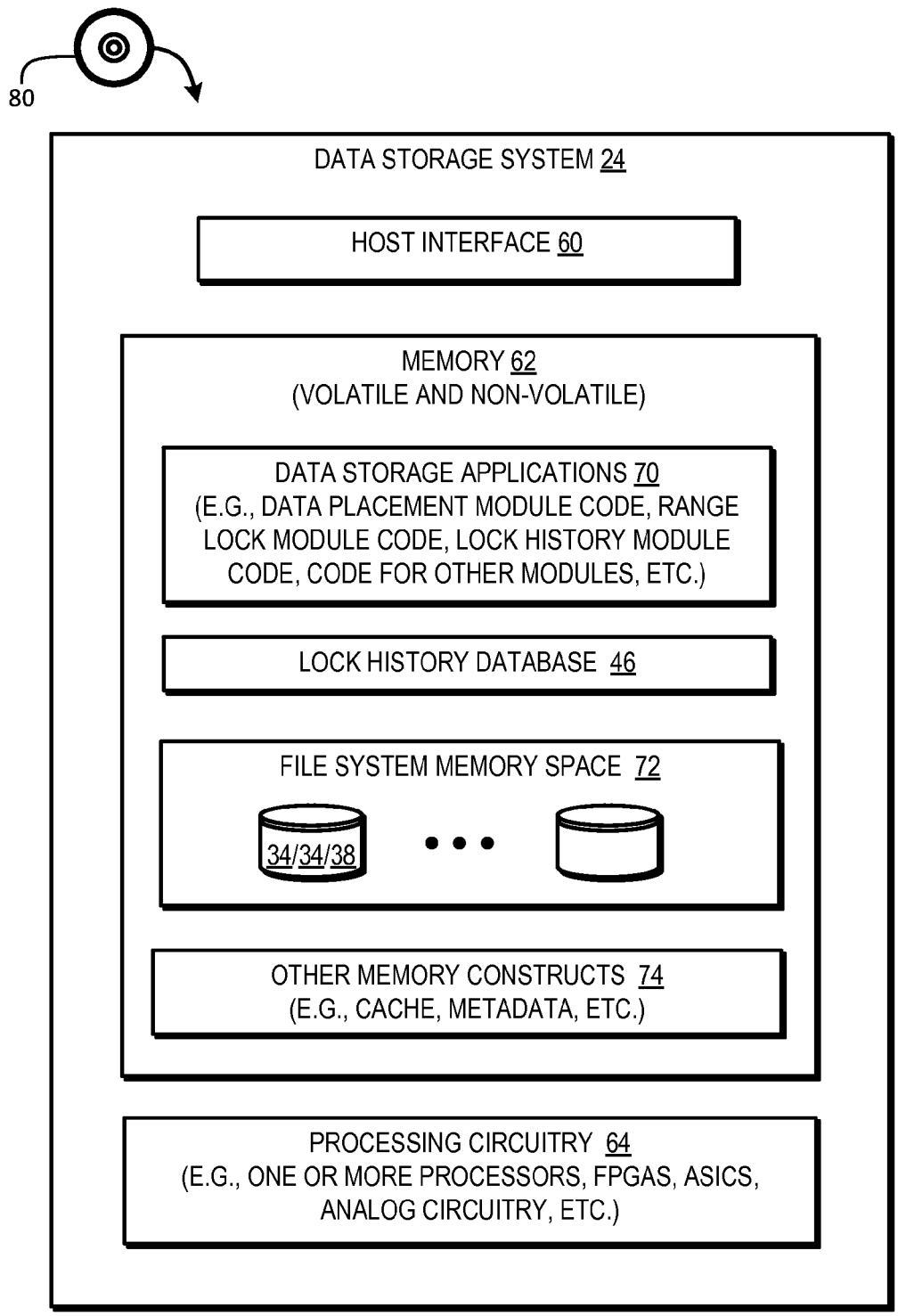
FIG. 2 is a block diagram of the data storage apparatus of FIG. 1.

FIG. 2 shows particular details of the data storage system 24 of the data storage environment 20 (also see FIG. 1). As shown in FIG. 2, the data storage system 24 includes a host interface 60, memory 62, and processing circuitry 64 among other things. The memory 62 includes a set of data storage applications 70, the lock history database 46, a file system memory space 72, and other memory constructs 74.

The host interface 60 is constructed and arranged to connect the data storage system 24 to the communications medium 26. Accordingly, the host interface 60 enables the data storage system 24 to communicate with the other components of the data storage environment 20 such as the host devices 22 (FIG. 1).

The memory 62 is intended to represent both volatile memory (e.g., DRAM, SRAM, etc.) and non-volatile memory (e.g., flash storage units, magnetic disk drives, tapes, etc.). The data storage applications 70 represent the operating system, drivers, utilities and tools, user-level applications, GUIs, and so on. The lock history database 46 contains the earlier-mentioned range-lock information 44. The file system memory space 72 represents persistent memory which contains the above-mentioned LUs 34, slices 36 and data extents or blocks 38. The other memory constructs 74 include additional memory-based items such as a buffer cache to temporarily cache copies of data accessed by the host devices 22, metadata for locks, metadata for the compression operations 40 (e.g., the active data extent list 42, etc.), and so on. Other memory constructs 74 may include flash cache located in or adjacent to the data storage system, server, or virtual location may be similarly utilized.

In some arrangements, the file system memory space 72 is tiered into several levels based on access speed. For example, the memory space 72 may include a first tier of flash memory, a second tier of SAS memory, and a third tier of near line SAS memory. In these arrangements, the buffer cache of the data storage system 24 (also see the other memory 74 in FIG. 2) is constructed and arranged to temporarily cache, on behalf of the host devices 22, copies of the data extents 38 which are persistently stored (and synchronized) in the respective storage tiers of the memory space 72. In other arrangements, data extents 38 may be cached in server cache (e.g., flash cache, DRAM cache, etc) or virtual cache.

The processing circuitry 64 is constructed and arranged to perform load and store operations (i.e., to process host IOs 30) on behalf of the host devices 22 (FIG. 1). Additionally, the processing circuitry 64 is constructed and arranged to control updating of the lock history database 46, and perform selective compression operations 40 based on information from the lock history database 46, among other things.

It should be understood that the processing circuitry 64 can be implemented in a variety of ways including one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 80 is capable of delivering all or portions of the software to the data storage system 24. The computer program product 80 has a non-transitory (or non volatile) computer readable medium which stores a set of instructions which controls one or more operations of the data storage system 24. Examples of suitable computer readable storage media include tangible articles of manufacture and apparatus which store instructions in a non volatile manner such as CD ROM, flash memory, disk memory, tape memory, and the like. Alternatively, some or all of the software may be downloaded from a local or remote network.

During operation, the data storage system 24 performs host IO operations 32 in response to the host IOs 30 received from the host devices 22 (FIG. 1). As the data storage system 24 imposes locks on ranges of data extents 38 prior to accessing the ranges of data extents 38, the data storage system 24 updates range-lock information 44 in the lock history database 46 to reflect the ranges of data extents 38 which are locked by the host IO operations 32.

With the range-lock information of the lock history database 46 now available for analysis, the contents of the lock history database 46 are able to identify whether data extents 38 within the memory space 72 are active or inactive. As a result, the data storage system 24 is able to effectively identify active data extents 38, and then evaluate the active data extents 38 for possible compression disable. Further details will now be provided with reference to FIG. 3.

Figure 3:
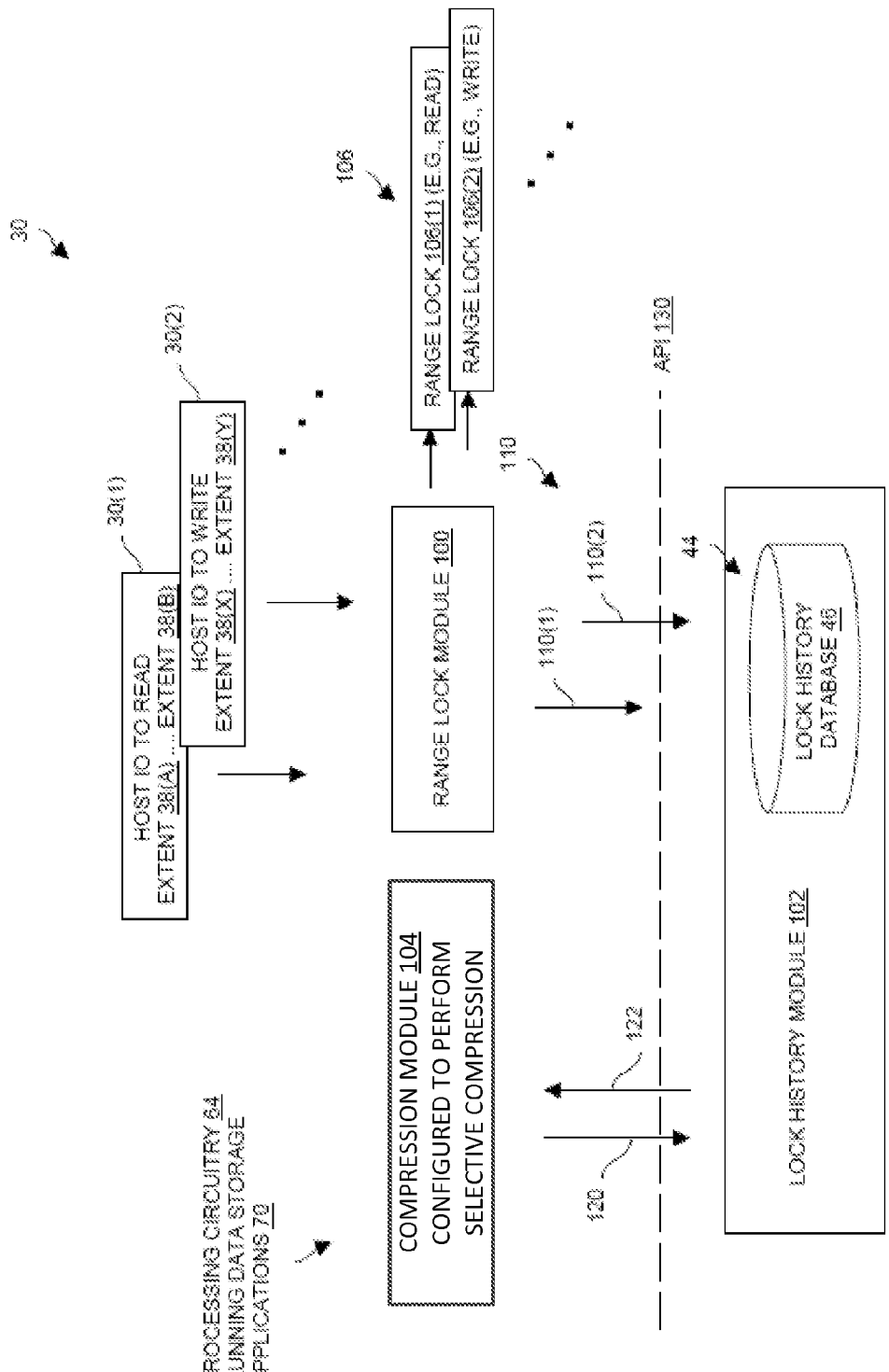
FIG. 3 is a block diagram of particular details of the data storage apparatus of FIG. 2.

FIG. 3 shows particular components of the data storage system 24 which are formed by the processing circuitry 64 when the processing circuitry 64 operates in accordance with the data storage applications 70 (also see FIG. 2). In particular, when the processing circuitry 64 executes code for a range lock module, the processing circuitry 64 forms a range lock module 100. Additionally, when the processing circuitry 64 executes code for a lock history module, the processing circuitry 64 forms a lock history module 102. Furthermore, when the processing circuitry 64 executes code for a compression module, the processing circuitry 64 forms a compression module 104. Likewise, the processing circuitry 64 is capable of executing other service module code (see applications 70 in FIG. 2) to form other service modules as well.

The range lock module 100 is constructed and arranged to impose range locks 106 on ranges of data extents 38 as the data storage system 24 performs the host IO operations 32, and thus preserve data coherency and consistency. By way of example, the range lock module 100 is shown as responding to a host IO 30(1) to read data extents 38(A), . . . , 38(B) by providing, as part of that host IO operation 32, a read lock 106(1) (i.e., a shared lock) on data extents 38(A), . . . , 38(B). Additionally, the range lock module 100 is shown as responding to another host IO 30(2) to write data extents 38(X), . . . , 38(Y) by providing, as part of that host IO operation 32, a write lock 106(2) (i.e., an exclusive lock) on data extents 38(X), . . . , 38(Y).

The lock history module 102 is constructed and arranged to manage the lock history database 46 holding the range-lock information 44 (also see FIG. 1). In particular, the lock history module 102 receives IO event messages 110 from the range lock module 100 which informs the lock history module 102 of the range locks 106 imposed by the range lock module 100. For example, when the range lock module 100 imposes the read lock 106(1) on data extents 38(A), . . . , 38(B), the range lock module 100 provides an IO event message 110(1) informing the range lock module 100 that a read lock 106(1) was imposed on the range of data extents 38(A), . . . , 38(B), and the lock history module 102 responds by adding an appropriate entry into the lock history database 46. Likewise, when the range lock module 100 imposes the write lock 106(2) on data extents 38(X), . . . , 38(Y), the range lock module 100 provides an IO event message 110(2) informing the range lock module 100 that a write lock 106(2) was imposed on the range of data extents 38(X), . . . , 38(Y), and the lock history module 102 responds by adding another appropriate entry into the lock history database 46.

As further shown by FIG. 3, the compression module 104 is able to communicate with the lock history module 102. In particular, the compression module 104 sends a request signal 120 to the lock history module 102 to obtain the contents of the lock history database 46. In response to the request signal 120, the lock history module 102 provides a response signal 122 containing the requested contents of the lock history database 46 thus enabling the compression module 104 to process the contents and operate based on the contents.

Once the range-lock information 44 is obtained by the compression module 104, the compression module 104 creates a list 42 of active data extents 38, evaluates the active data extents 38 on the list 42 for possible compression disable, and selectively compresses certain data extents 38 to improve subsequent IO performance. Further details will now be provided with reference to FIGS. 4 through 7.

Figure 4:
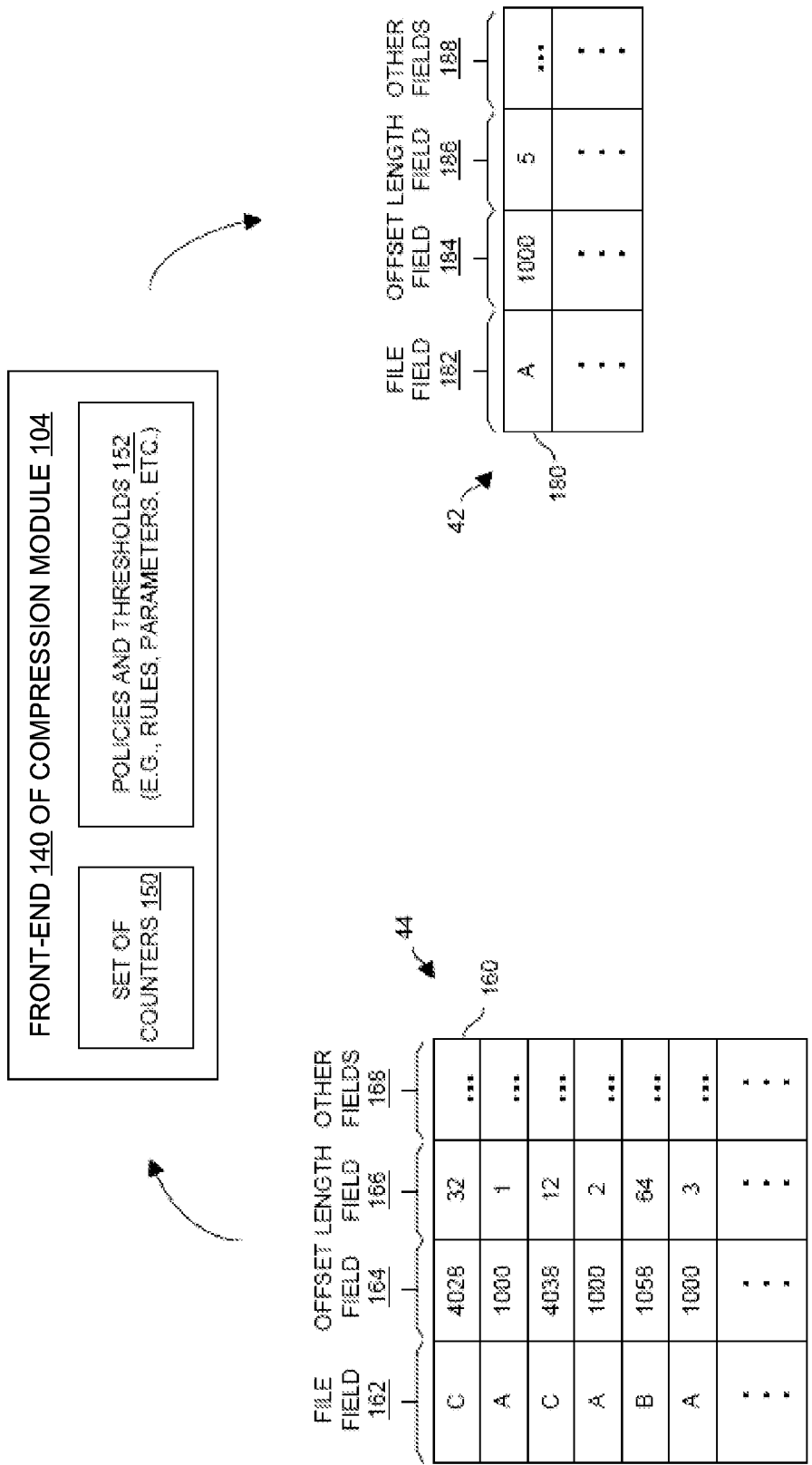
FIG. 4 is a block diagram of particular details of a front-end portion of a selective compression module of the data storage apparatus of FIG. 2.

FIG. 4 shows certain operations of a front-end portion 140 of the compression module 104. In particular, the front-end portion 140 obtains the range-lock information 44 from the lock history module 102 (also see FIG. 3), and constructs the list 42 of active data extents 38 based on the range-lock information 44. To this end, the front-end portion 140 utilizes a set of counters 150 as well as policies, heuristics and thresholds 152. The set of counters 150 enables the front-end portion 140 to measure IO activity of ranges of data extents 28. The policies and thresholds 152 (e.g., rules, operating parameters, predefined threshold levels, etc.) define criteria as to whether the ranges of data extents 28 are categorized as active or inactive.

As shown in FIG. 4, the range-lock information 44 includes a set of range lock entries 160. Each range-lock entry 160 includes a file field 162 to hold a file identifier (e.g., the identifier of a work or production file for a file system, etc.), an offset field 164 to hold an offset value identify a starting data extent 38 of a locked range, a length field 166 to hold a length value to identify the length of the locked range, and other fields 168 to hold additional range lock information (e.g., the lock type, timestamp information, etc.). The range of locked data extents 38 is defined by the offset value and the length value. Of course, other ways for defining the range of locked data extents 38 are suitable for use as well (e.g., starting and end offset values, etc.).

As further shown in FIG. 4, the list 42 of active data extents 38 includes a set of list entries 180. Each list entry 180 includes a file field 182 to hold a file identifier (e.g., the identifier of a work or production file for a file system, etc.), an offset field 184 to hold an offset value to identify a starting data extent 38 of a range deemed to be active, a length field 186 to hold a length value identifying the length of the active range, and other fields 188 to hold additional active data extent information (e.g., the lock type, timestamp information, etc.). Again, the range of data extents 38 is defined by the offset value and the length value, but could be defined other ways (e.g., via starting and end offset values, etc.).

For the front-end portion 140 of the compression module 104 to add an entry 180 to the list 42 for a particular range of data extents 38, the range lock information 44 may indicate that the range of data extents 38 has been accessed more than a predetermined threshold level within a recent period of time (e.g., within the last hour, within the last day, since the information 44 was last obtained from the lock history module 102, etc.). In some arrangements, the range of data extents 38 may have been accessed at least once within the predetermined time period (i.e., the threshold level is zero). In other arrangements, the range of data extents 38 may have been accessed more than once within that time period (i.e., the predetermined threshold level is one, two, three, etc.). Thus, the predetermined threshold level and the time period control the criteria used by the front-end portion 140 to distinguish between active data and inactive data.

It should be understood that the front-end portion 140 of the compression module 104 may be set to run in the background (i.e., use free processor cycles) in an ongoing manner. In other arrangements, the front-end portion 140 is scheduled to wake up (i.e., transition from an inactive mode to an awake mode) periodically (e.g., once every 15 minutes, once every hour, etc.) or during preset time windows (e.g., after 7 P.M.). In yet other arrangements, the front-end portion 140 is scheduled to wake up when the level of host IO activity drops below a certain threshold and thus take advantage of opportune times of low traffic. In still other arrangements, the front-end portion 140 may be scheduled to wake up when remaining available storage reaches a particular level, amount, or other such indicator. Moreover, various combinations of these activation criteria as well as others (e.g., not while a backup utility is running, etc.) can be combined and tailored in order to run the front-end portion 140 during advantageous times and/or operating criteria of data storage system operation.

Figure 5:
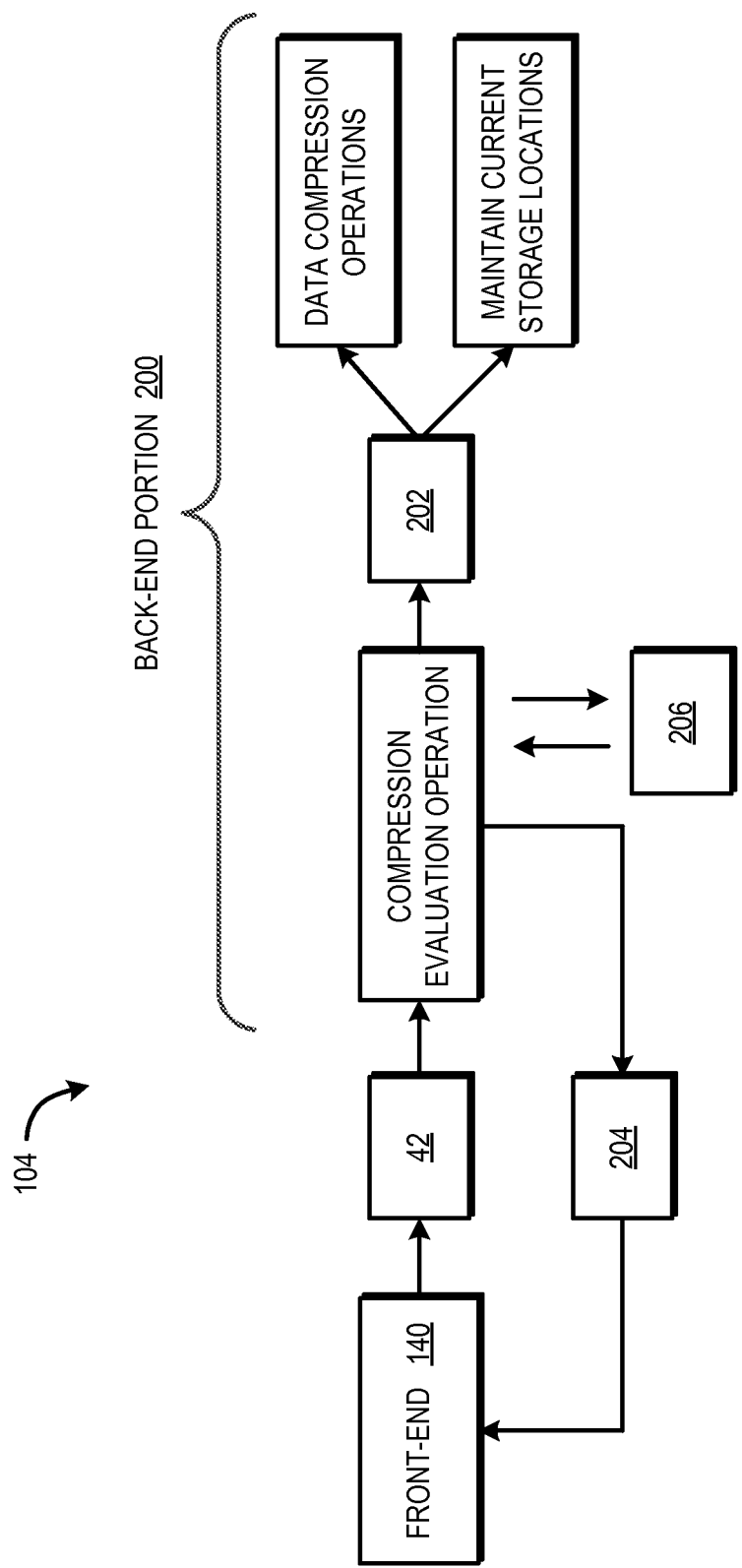
FIG. 5 is a block diagram of particular details of a back-end portion of the selective compression module of the data storage apparatus of FIG. 2.

FIG. 5 shows certain operations of a back-end portion 200 of the compression module 104. In particular, the back-end portion 200 receives the list 42 from the front end 180 and performs an evaluation operation for selective compression for each entry 180 on the list 42 (also see FIG. 4). Along these lines, the back-end portion 200 examines the range of active data extents 38 identified by each entry 180 of the list 42, and outputs a result 202 indicating whether the back-end portion 200 should perform compression disable on the active data extents 38.

When the result 202 of the evaluation operation has a value indicating that compression should be performed on particular data extents 38 identified by the list 42, the back-end portion 200 performs a set of data movement operations which moves the particular data extents 38 to new storage locations within the memory space 72 to compress the particular data extents 38. As mentioned earlier, in some arrangements, this transfer may result in placing the particular data extents 38 in a different storage tier. Additionally, in some arrangements, the back-end portion 200 moves more than the particular data extents 38 identified by the list 42 (e.g., neighboring data extents 38, remaining portions of entire files, etc.) in an attempt to improve future IO access performance even further.

However, when the result 202 of the evaluation operation produces a value indicating that compression should not be performed, the back-end portion 200 of the compression module 104 simply maintains the active data extents 38 in their current storage locations within the memory space 72, thereby disabling compression on these extents. Alternatively, in some situations, it may be advantageous to migrate and compress the active data extents 38 (e.g., IO access may be improved by compressing and migrating active data extents 38 to a faster storage tier such as flash memory rather than leaving the active data extents 38 in an uncompressed state on a slower storage tier). It should be understood that a variety of standard factors may dictate to the back end portion 200 whether compression should be performed, and that these particular factors will not be discussed further.

In other alternative embodiments, a user may provide a range of extents that the user wishes to force compression on. For example, active data may migrate to a fast storage tier, such as flash memory. Because flash memory is faster and more expensive that slower tiers, flash tiers tend to have a high utilization. A user may be aware that a particular data set may be very active and, consequently, will more often than not be stored in a flash tier. In this case, a user may desire to compress this data to conserve flash tier memory and accept potential performance degradation if any. In such an arrangement, the user may still configure the compression module to disable compression on other active or hot data blocks and enable compression of the selected hot data blocks and inactive or cold data blocks.

In yet another alternative embodiment, a user may initiate compression on a particular set of data extents. However, the compression module may recognize that a group of extents elsewhere are inactive and considerable compression ratios may be achieved should these extents be compressed. In such a situation, the compression module may provide an indicator (e.g., a suggestion or report) to the user providing information sufficient to alert the user. In an alternative embodiment, the user may set a compression mode whereby the compression module will optimize compression processes. For example, in a high compression configuration, the compression module may ignore or override user settings to ensure maximum compression or performance occurs. A combination of automatic and selected extents may also be used.

If the back-end portion 200 of the compression module 104 has compressed a set of data extents 38 identified by an entry 180 on the list 42, the back-end portion 200 sends a notification 204 to the front-end portion 140 to clear the counter (or counters) 150 associated with the particular set of data extents 38 (also see FIG. 4). However, if the back-end portion 200 chose not to compress the set of data extents 38, the back-end portion 200 does not send the notification 204 thus enabling the counter (or counters) 150 to remain updated with range-lock activity information 44.

Additionally, if the back-end portion 200 of the compression module 104 has compressed a set of data extents 38, the back-end portion 200 updates metadata 206 which enables the back-end portion 200 to track its compression activity (also see the other memory constructs 74 in FIG. 2). In particular, the back-end portion 200 creates, as part of the metadata 206, a timestamp record to indicate when the set of data extents 38 were last compressed. Accordingly, the back-end portion 200 can use such metadata 206 in the future for improved compression frequency control of the set of data extents 38 (e.g., to compress a particular set of data extents 38 no more than once an hour or once a day, etc.).

Figure 6:
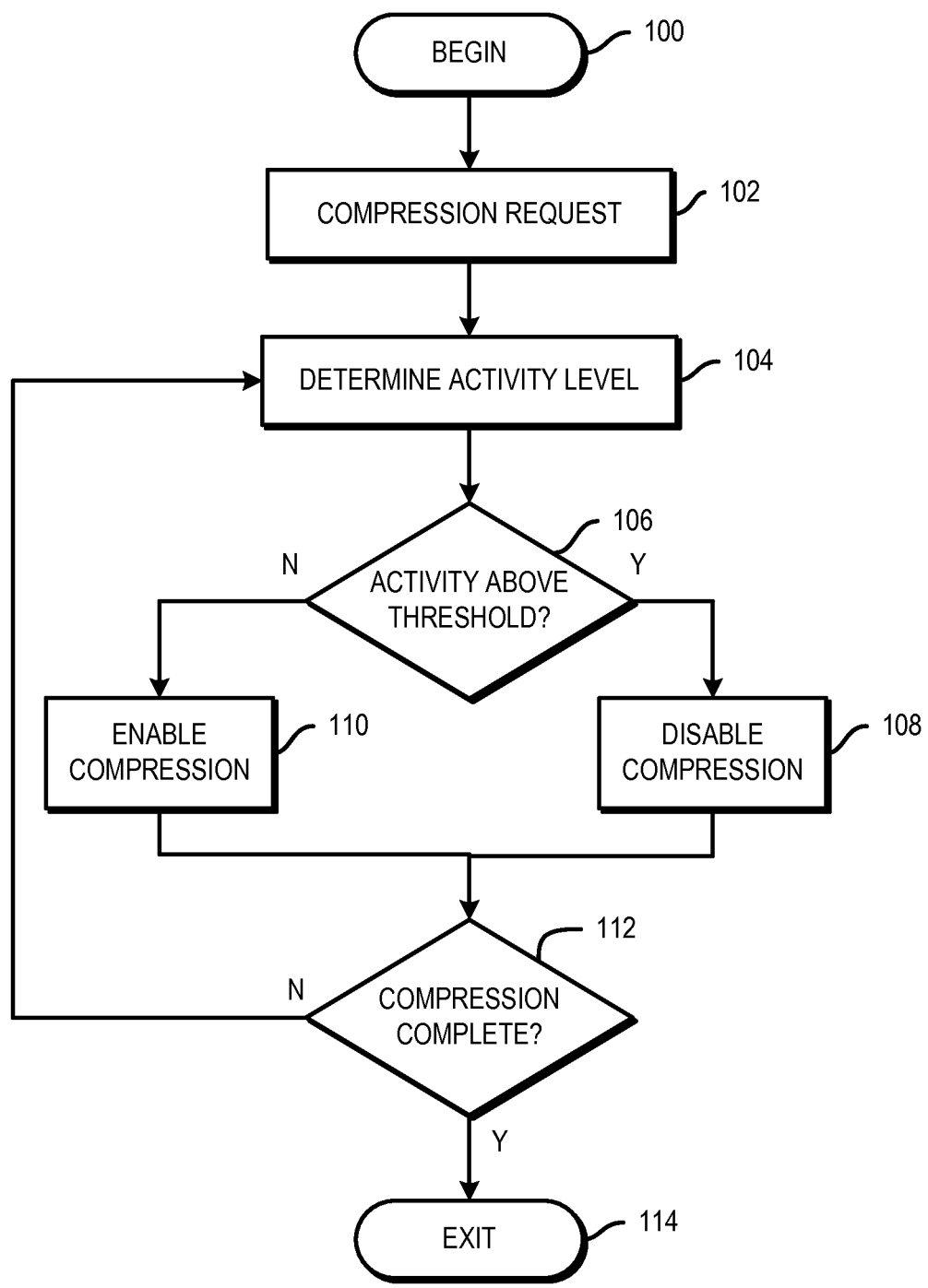
FIG. 6 is a flowchart of a selective compression procedure performed by the data storage apparatus of FIG. 2.

FIG. 6 is a flow diagram that illustrates an example method for selectively compressing data in data storage systems similar to that described above. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method can begin with a step 100. The method can be initiated manually by a user, for example, by entering a command in a command-line-interface or by clicking on a button or other object in a graphical user interface (GUI). The method can also be initiated automatically by storage management software and/or can be scheduled to run automatically at certain dates and times. In one embodiment, a storage system can be configured to execute selective compression for a pre-determined number minutes, hours, etc. during some off-peak period in which the storage system is typically at its lightest IO load. Execution of the method can also be based on various user-specified constraints. For example, a user can specify one or more LUs for which selective compression will be applied. A user can also specify one or more tier types (i.e., level or performance) to be considered during the selective compression so that one or more slices are migrated to tiers having a higher or lower performance.

The method may further include a step 102 where a request to compress a particular data set, such as an extent or block, stored within a memory space. The request may be, for example, provided by a user. Alternatively, an automated system procedure may initiate the selective compression process.

In step 104, the method further includes determining an activity level for the data block where the activity level indicated how often the particular data block if accessed and may be determined by, for example, a particular temperature of the data block using range lock statics as was described above with reference to FIGS. 3-5.

In step 106, a data blocks activity level is compared to a predetermined threshold. The threshold can be provided by a user, configured by the system, based on a combination of the two, or other such criteria. If the activity level is above a threshold, the method proceeds to step 108. At step 108, compression for the data block is disabled. As described above, such disabling of compression for high activity or hot data advantageously reduces unnecessary overhead and system contention when data is compressed only to be uncompressed a short time later. However, if the data block's activity is below the predetermined threshold, at step 110, compress is enabled and compression proceeds for that particular data block.

In step 112, the method determines if the selective compression process is complete and if not, returns to step 104 where steps 104-110 are repeated, otherwise the method exits at step 114.

Figure 7:
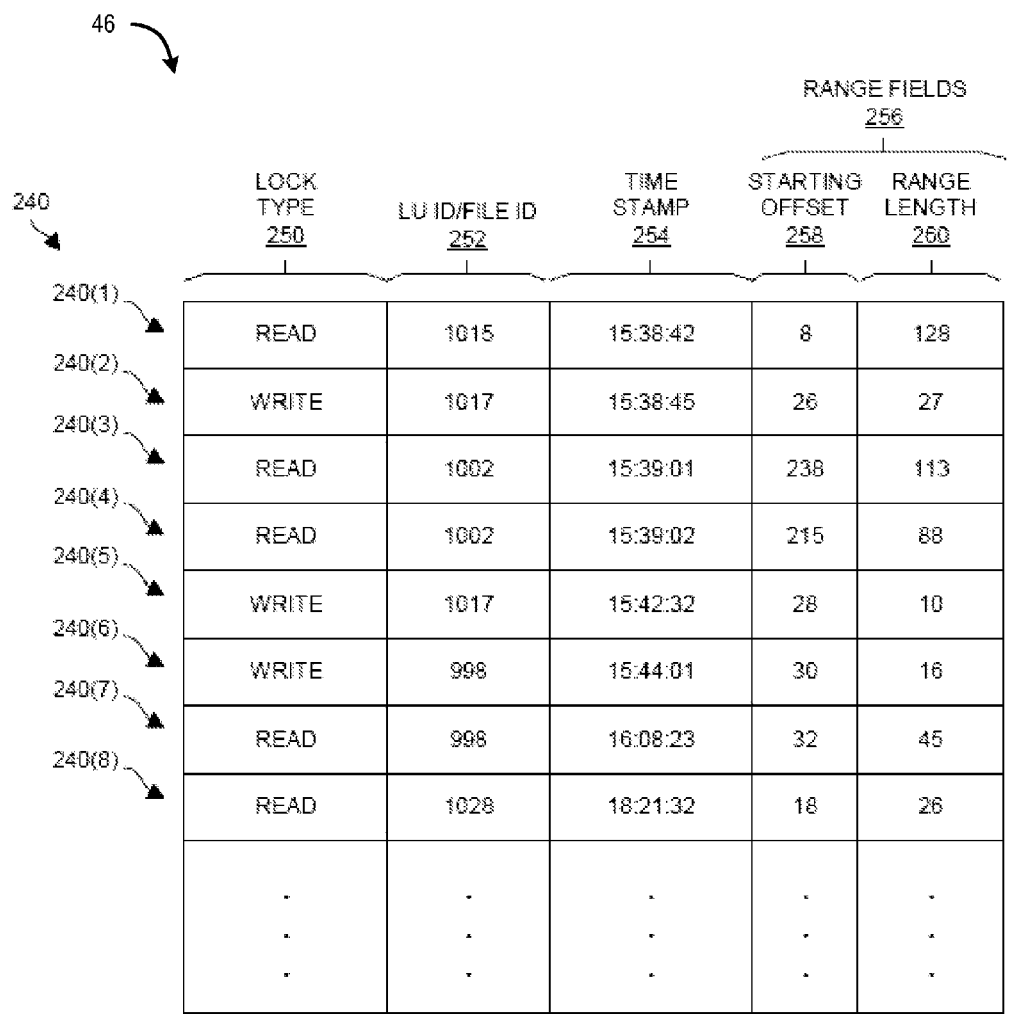
FIG. 7 is a block diagram of a portion of a lock history database which is managed by the data storage apparatus of FIG. 2.
Figure 8:
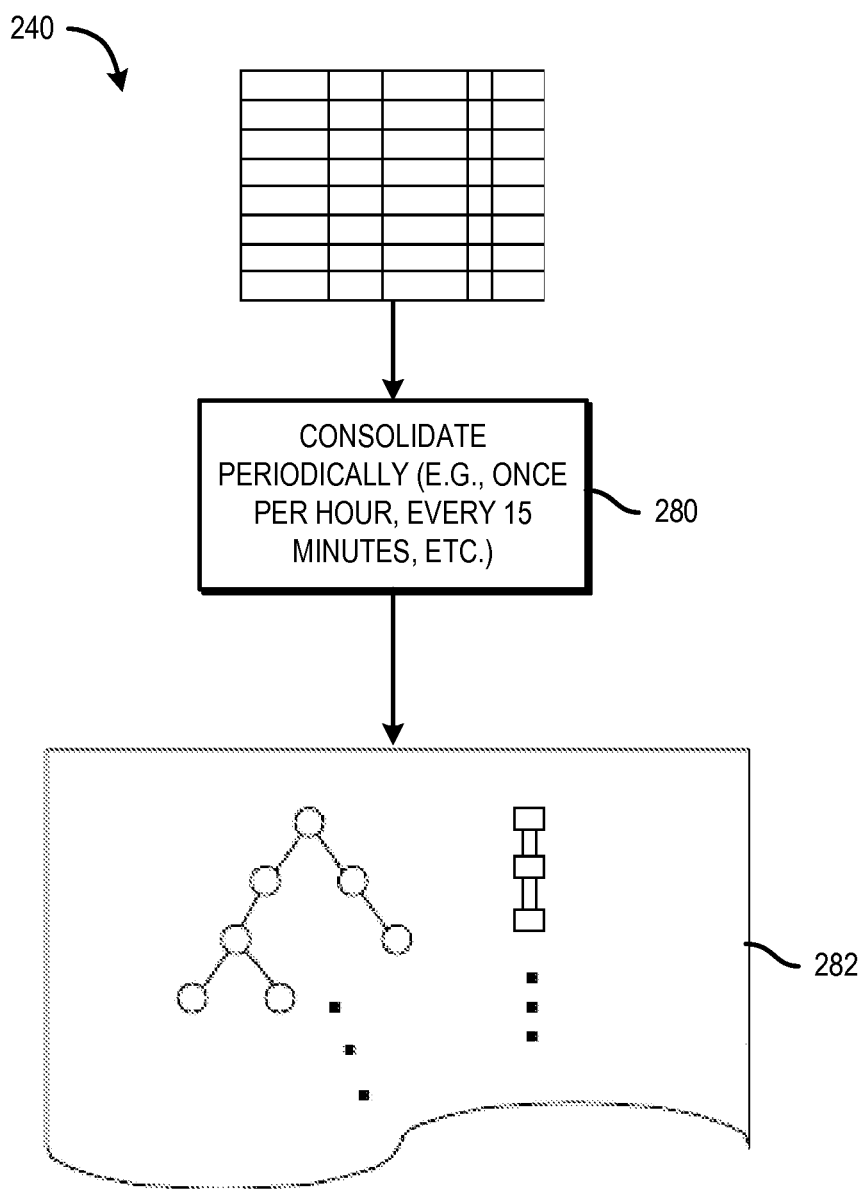
FIG. 8 is a block diagram of a consolidation process which is performed on the lock history database by the data storage apparatus of FIG. 2.
Figure 9:
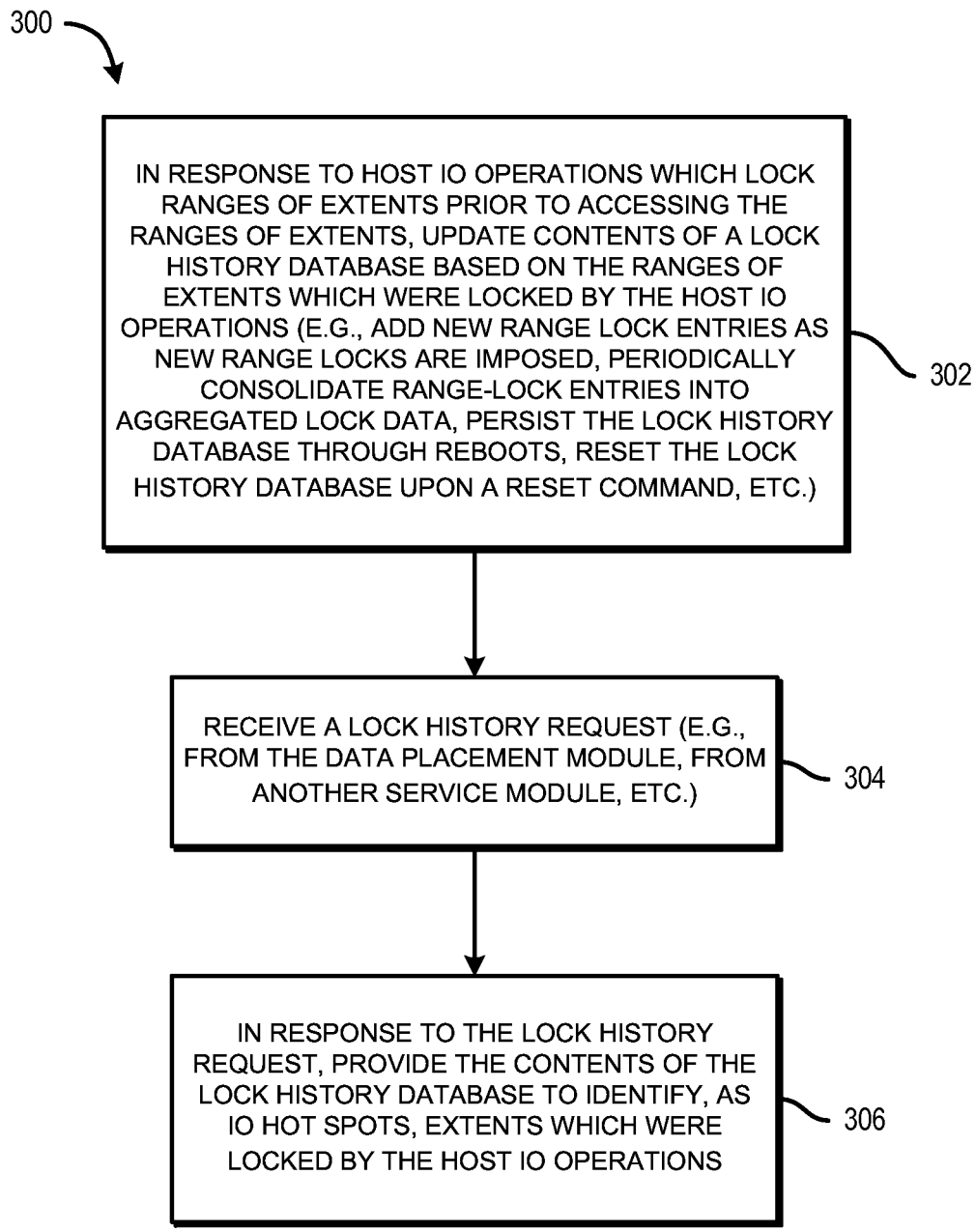
FIG. 9 is a flowchart of a procedure for managing access to the lock history database which is performed by the data storage apparatus of FIG. 2.

FIGS. 7 through 9 show particular details of the lock history module 102. In particular, FIG. 7 shows a set of range-lock entries 240 of the lock history database 46. FIG. 8 shows a consolidation operation which is periodically performed by the lock history module 102 on the set of range-lock entries 240 when managing the range-lock information of the lock history database 46. FIG. 9 shows a flowchart of a procedure 300 which is performed by the lock history module 102.

As shown in FIG. 7, the lock history database 46 includes a set of range-lock entries 240. Each time the lock history module 102 receives an event message 110 informing the lock history module 102 of a new lock 106 imposed on a range of extents 38 from the range lock module 100, the lock history module 102 adds a new range lock entry 240 in the lock history database 46 to record that lock 106 (also see FIG. 3).

Each range-lock entry 240 includes a lock type field 250, a logical unit identifier (or file ID) field 252, a time stamp field 254, and a set of range fields 256. The fields of each range lock entry 240 hold range-lock information corresponding to a range lock 106 imposed by the range lock module 100 during a particular host IO operation 32 thus recording the details of that range lock 106. In particular, the lock type field 250 holds a value indicating the type of lock (e.g., a read lock or a write lock) for that range lock 106. The logical unit identifier field 252 holds a logical unit identifier to identify a logical unit for that range lock 106 (i.e., a particular logical unit among multiple logical units maintained for reading and writing by the data storage system 24). The time stamp field 254 holds a time stamp indicating a particular time in which a particular host IO operation 32 locked the range of extents 38. This field may also be used to indicate a time when compression was last performed. The set of range fields 256 holds range data identifying the particular range of extents 38 which was locked by the particular host IO operation 32.

In some arrangements, the set of range fields 256 includes a starting offset field 258 and a range length field 260. The starting offset field of a range-lock entry 240 holds a starting offset of a particular range lock 106, and the range length field 260 holds the length of that particular range lock 106.

In other arrangements, the set of range fields 256 define range-locks differently. For example, in some arrangements, the set of range fields 256 simply includes a start offset field and an end offset field to hold the starting and ending offsets of a particular range lock 106.

FIG. 8 illustrates a process 280, which is performed by the lock history module 102 (FIG. 3), to consolidate the set of range-lock entries 240 of the lock history database 46 into aggregated lock data 282. Once the set of range-lock entries 240 is consolidated into the aggregated lock data 282, the set of range-lock entries 240 can be deleted from the lock history database 46 to reduce the amount of consumed memory 62. Such a process 280 is capable of being performed routinely (e.g., every hour, every 15 minutes, etc.) as well as manually (e.g., in response to a user command). As a result, the lock history database 46 includes a current set of range-lock entries 240 (i.e., range-lock entries 240 which have not yet been processed), aggregated lock data 282, or both if new range-lock entries 140 have been added since the consolidation process 280 was last performed.

Once a set of range-lock entries 240 has been processed to produce aggregated lock data 282, the aggregated lock data 282 indicates the extents 38 that had been identified by the set of range-locks 106. Accordingly, the aggregated lock data 282 identifies extents which have been recently accessed and which are thus considered active or "hot". Once the aggregated lock data 282 has been formed, future processing of a new set of range-lock entries 240 (i.e., range-lock entries 240 which have been added to the lock history database 46 since the last consolidation process 280) involves adjusting or updating the existing aggregated lock data 282 based on the new set of range-lock entries 240.

In some arrangements, when the lock history module 102 receives a request signal 120 for the contents of the lock history database 46 (FIG. 3), the lock history module 102 performs the consolidation process 280 on any existing range-lock entries 240 to update the aggregated lock data 282. The lock history module 102 then provides, as a response signal 122 (FIG. 3), only the aggregated lock data 282. For example, the response signal 122 may include a file or a pointer to a file containing just the aggregated lock data 282 or a copy of the aggregated lock data 282.

In some arrangements, the aggregated lock data 182 persists until it is cleared (e.g., in response to a user command to reset the values of the lock history database 46). In some arrangements, the lock history database 46 resides in non-volatile storage so that the lock history database 46 persists even during a reboot or power-down of the data storage system 24.

In some arrangements, the aggregated lock data 282 includes a mapping table which maps tallied access counts to each extent 38. In other arrangements, the aggregated lock data 282 includes nodes corresponding to time intervals (e.g., one hour ago, two hours ago, etc.) where each node identifies ranges of extents 38 which have been accessed within a particular time interval. Accordingly, the particular structure for the range-lock information in the aggregated lock data 282 may take a variety of forms, e.g., trees, linked lists, counters, combinations thereof, and so on.

One will appreciate that a variety of criteria may be used as a determining factor as to whether each extent 38 is active or inactive from the perspective of the lock history module 102. In some arrangements, if the lock history database 46 indicates that an extent 38 was accessed within a predefined amount of time (e.g., an hour, six hours, etc.), the extent 38 is considered active. In other arrangements, if the lock history database 46 indicates that an extent 38 was accessed at least a certain predefined amount of times within a particular amount of time (e.g., at least 3 times within the last 24 hours, etc.), the extent 38 is considered active. Similarly, an extent 38 may be considered inactive if the extent 38 fails to satisfy the active criteria. Further details will now be provided with reference to FIG. 9.

FIG. 9 shows a procedure 300 which is performed by the processing circuitry 64 of the data storage system 24, while operating as the lock history module 102, to identify IO hot spots (also see FIGS. 2 and 3). In step 302, the lock history module 102 updates the contents of the lock history database 46 based on the ranges of extents 38 which were locked by host IO operations 32. In particular, as the range lock module 102 locks ranges of extents 38 as part of the host IO operations 32, the range lock module 102 issues event messages 110 to the lock history module 102 informing the lock history module 102 of the range locks 106 (FIG. 3).

In step 304, the lock history module 102 receives a lock history request. For example, the compression module 104 (or another service module) may provide a request signal 120 to the lock history module 102 requesting the contents of the lock history database 46.

In step 306, the lock history module 102 providing the contents of the lock history database 46 to identify, as the IO hot spots, extents 38 which were locked by the host IO operations 38. In particular, the lock history module 102 outputs a response signal 122 back to the requesting compression module 104.

As described above, improved techniques are directed to selective compression based on input/output (IO) hot spots (i.e., active data extents 38 in memory). Such techniques do not require compression of an entire file system. Rather, such techniques enable the data in the most active areas of a memory space 72 to be automatically identified for possible compression. The data is then evaluated as a candidate for compression and, if the data is selected for compression, compression is carried out for that data. Such evaluation of data in the most active areas of the memory space 72 for selective compression provides a smart methodology for prioritizing compression effort. Furthermore, such selective compression can have significantly less impact on system performance than a conventional compression process that attempts to compress an entire file system at once. In some situations, such selective compression is even carried out transparently in the background in an ongoing manner (e.g., consuming free processor cycles).

While various embodiments of the present disclosure have been particularly shown and described, it will be understood by those skilled in the art that various changes in form and details may be made therein without departing from the spirit and scope of the present disclosure as defined by the appended claims.

For example, it should be understood that, in an alternative arrangement, the front-end portion of the compression module 104 outputs, as the list 42, an exhaustive listing of all ranges of extents that were accessed and marks each range with a temperature such as hot, warm, cold, etc. In other arrangements, the compression module 104 relies on the lock history module 102 to provide the list 42 since, as described above, the lock history module 102 is capable of aggregating and processing data to identify active and inactive ranges of extents 38. Such modifications and enhancements are intended to belong to various embodiments of the disclosure.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for managing data compression in storage systems, the method comprising:
   receiving a request to compress particular data stored within a memory space;
   determining an activity level for the particular data, wherein determining the activity level includes processing a historical log of locks imposed on the memory space to ascertain the number of times the particular data stored within the memory space was accessed during a recent time period, wherein the historical log of locks imposed on the memory space identifies ranges of extents which were locked during IO operations performed on the memory space, wherein processing the historical log of locks imposed on the memory space includes updating a set of counters based on the ranges of extents which were locked during the IO operations and which are identified by the historical log of locks;
   determining if compressing the particular data will increase or decrease system performance;
   if compressing the particular data will increase system performance, enabling compression of the particular data determined to have an activity level below a predetermined activity level threshold; and
   if compressing the particular data will decrease system performance, disabling compression of the particular data determined to have an activity level above the predetermined activity level threshold.

2. The method of claim 1, further comprising:
   after performing the compression operation, creating a compression timestamp record to indicate when the particular data stored within the memory space was last compressed.

3. The method of claim 1, further comprising:
   wherein receiving a request to compress particular data stored within a memory space includes receiving a request from a user to compress particular data;
   determining that compressing the particular data will reduce system performance; and
   providing an indicator to the user representative of the determination.

4. The method of claim 1, further comprising:
   determining that compressing data other than the particular data will improve system performance; and
   providing an indicator to the user representative of the determination.

5. The method of claim 1, wherein determining an activity level for the particular data includes determining at least three different threshold activity levels.

6. The method of claim 1, further including configuring a second set of particular data and enabling compression of the second set of particular data determined to have an activity level below the predetermined threshold.

7. A system for managing data compression in storage systems, the system comprising:
   a host interface;
   memory which provides a memory space; and
   processing circuitry coupled to the host interface and the memory, the processing circuitry being constructed and arranged to:
   receive a request to compress particular data stored within a memory space;
   determine an activity level for the particular data, wherein determine the activity level includes processing a historical log of locks imposed on the memory space to ascertain the number of times the particular data stored within the memory space was accessed during a recent time period, wherein the historical log of locks imposed on the memory space identifies ranges of extents which were locked during IO operations performed on the memory space, wherein processing the historical log of locks imposed on the memory space includes updating a set of counters based on the ranges of extents which were locked during the IO operations and which are identified by the historical log of locks;
   determine if compressing the particular data will increase or decrease system performance;
   if compressing the particular data will increase system performance, enable compression of the particular data determined to have an activity level below a predetermined activity level threshold; and
   if compressing the particular data will decrease system performance, disable compression of the particular data determined to have an activity level above the predetermined activity level threshold.

8. The system of claim 7, further comprising:
   after performing the compression operation, creating a compression timestamp record to indicate when the particular data stored within the memory space was last compressed.

9. The system of claim 7, further comprising:
   wherein receiving a request to compress particular data stored within a memory space includes receiving a request from a user to compress particular data;

determining that compressing the particular data will reduce system performance; and providing an indicator to the user representative of the determination.

10. The system of claim 7, wherein the processing circuitry is further configured to:

determine that compressing data other than the particular data will improve system performance; and provide an indicator to the user representative of the determination.

11. The system of claim 7, wherein the processing circuitry is further configured to determine an activity level for the particular data includes determining at least three different threshold activity levels.

12. The system of claim 7, wherein the processing circuitry is further configured to configure a second set of particular data and enabling compression of the second set of particular data determined to have an activity level above the predetermined threshold.

13. A computer program product having a non-transitory computer readable medium storing a set of instructions which, when carried out by computerized circuitry, directs the computerized circuitry to manage data fragmentation by performing a method comprising:

receiving a request to compress particular data stored within a memory space;

determining an activity level for the particular data, wherein determining the activity level includes processing a historical log of locks imposed on the memory space to ascertain the number of times the particular data stored within the memory space was accessed during a recent time period, wherein the historical log of locks imposed on the memory space identifies ranges of extents which were locked during IO operations performed on the memory space, wherein processing the historical log of locks imposed on the memory space includes updating a set of counters based on the ranges of extents which were locked during the IO operations and which are identified by the historical log of locks;

determining if compressing the particular data will increase or decrease system performance;

if compressing the particular data will increase system performance, enabling compression of the particular data determined to have an activity level below a predetermined activity level threshold; and if compressing the particular data will decrease system performance, disabling compression of the particular data determined to have an activity level above the predetermined activity level threshold.

\* \* \* \* \*